(12) United States Patent
Khosravi et al.

(10) Patent No.: US 10,924,052 B1
(45) Date of Patent: Feb. 16, 2021

(54) MOTOR CONTROL SYSTEM WITH PHASE CURRENT POLARITY DETECTION

(71) Applicant: Allegro MicroSystems, LLC, Manchester, NH (US)

(72) Inventors: Kamyar Khosravi, Manchester, NH (US); Masahira Kurihara, Prague (CZ); Gianluca Allegrini, Musselburgh (GB); Robert D. Christie, Fife (GB)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 16/535,271

(22) Filed: Aug. 8, 2019

(51) Int. Cl.
*H02P 27/00* (2006.01)
*H02P 27/08* (2006.01)
*H02M 1/38* (2007.01)
*H02M 7/5387* (2007.01)

(52) U.S. Cl.
CPC ............ *H02P 27/085* (2013.01); *H02M 1/38* (2013.01); *H02M 7/53871* (2013.01); *H02M 2001/385* (2013.01)

(58) Field of Classification Search
None
See application file for complete search history.

(56) References Cited

U.S. PATENT DOCUMENTS

| | | | | |
|---|---|---|---|---|
| 4,933,621 A | * | 6/1990 | MacMinn | H02P 25/092 310/163 |
| 5,166,591 A | * | 11/1992 | Stephens | H02P 9/40 318/701 |
| 6,344,720 B1 | * | 2/2002 | Koski | H02P 6/085 318/400.04 |
| 7,816,905 B2 | | 10/2010 | Doogue et al. | |
| 8,917,043 B2 | | 12/2014 | Reynolds et al. | |
| 9,203,339 B2 | | 12/2015 | Sato | |
| 9,780,706 B2 | | 10/2017 | Allegrini et al. | |
| 9,887,653 B2 | | 2/2018 | Ross et al. | |
| 9,929,683 B2 | | 3/2018 | Sonoda et al. | |
| 2009/0039807 A1 | * | 2/2009 | Yabusaki | H02P 25/18 318/244 |

(Continued)

*Primary Examiner* — Bentsu Ro
(74) *Attorney, Agent, or Firm* — Daly, Crowley, Mofford & Durkee, LLP

(57) ABSTRACT

A system is provided for driving a load such as a multi-phase motor. The system includes a motor driver that has a plurality of switches coupled to a motor to drive a current through each of a plurality of phase coils of the motor. A polarity detection circuit detects a polarity of the current in one or more of the phase coils of the motor to generate a polarity value that represents the detected current polarity. The polarity detection circuit can include at least one comparator that has a first input coupled to a node between two of the plurality of switches, a second input coupled to receive a threshold value, and an output from which the polarity value is provided. Further included is a controller that is configured to provide a plurality of pulse width modulated (PWM) output control signals to the plurality of switches to control the switches to drive the current through the plurality of phase coils of the motor. In response to the polarity value, the controller is configured to alter a duty cycle of the plurality of PWM output control signals to modify a voltage applied to the plurality of phase coils of the motor.

20 Claims, 5 Drawing Sheets

(56) References Cited

U.S. PATENT DOCUMENTS

| | | | |
|---|---|---|---|
| 2010/0253250 A1* | 10/2010 | Marvelly | ............... H02P 6/153 |
| | | | 318/3 |
| 2014/0368139 A1* | 12/2014 | Zhou | ......................... H02P 6/28 |
| | | | 318/400.13 |
| 2020/0021212 A1 | 1/2020 | Yamada et al. | |
| 2020/0028456 A1 | 1/2020 | Morioka et al. | |

\* cited by examiner

MOTOR CONTROL SYSTEM WITH PHASE CURRENT POLARITY DETECTION

BACKGROUND

Circuits to precisely control, drive, and regulate electric motors, such as brushless DC ("BLDC") motors, are required in many applications. These circuits often create pulse-width modulated ("PWM") drive signals that are used to control power to the motor.

Motors may include multiple coils which, when energized, cause the motor to turn. The periods of time in which the coils are energized are often referred to as so-called "phases" of the motor and the coil (or coils) that are energized during a phase may be referred to as phase coils.

The sequence and timing of which coils are energized is dependent upon the design of the motor. As an example, a motor may have three coils that must be energized in sequence, i.e., a round-robin fashion, in order to turn the motor. Such a motor may have three "phases." In each phase, a different one or more of the three coils is energized.

Some motor drivers include switches coupled in pairs between a power line and a return line. The node between each pair of switches is coupled to a respective coil of motor. As the switches open and close, they provide power to the motor and provide a return path from the motor. The switches may be provided by Field Effect Transistors (FETs), each of which receives a PWM control signal at its gate terminal for selectively opening and closing the FET switches. As the on-time of the PWM control signal increases from zero to one hundred percent, the amount of current supplied to the motor increases proportionally from zero to its maximum value. Thus, the amount of current supplied to motor can be controlled by altering the pulse width of the FET gate drive signals.

Often these switches are not ideal and therefore cannot be turned on and off instantaneously. To avoid short circuits caused by the non-ideal switches, the switching sequence can include so-called "dead times" when both switches in each switch pair are open. While needed to avoid short circuits, dead time can result in voltage distortion and increased total harmonic distortion within the system.

It is known to adjust a duty cycle of the PWM control signals to adjust for duty cycle changes caused by dead time. Many known systems merely adjust the duty cycle by a predetermined amount of time that is often uniformly applied to the duty cycle regardless of how much the duty cycle is modified by the inclusion of dead time periods.

SUMMARY

A sensorless phase current polarity detector is provided to determine the polarity of current flowing into and out of a load. The sensed current polarity can be used to adjust the duty cycle of the voltage delivered to the load to compensate for dead time within the system and reduce the amount of total harmonic distortion in the system. Comparators within an inverter system are used to determine the polarity of the current through the load at the end of the dead time periods. In embodiments where the load is a motor, phase comparators determine the current polarity through the motor during the dead time of each motor phase.

Described herein is a system for driving a motor that includes a motor driver that has a plurality of switches that are coupled to the motor to drive a current through each of a plurality of phase coils of the motor. Also included is a circuit that is configured to detect a polarity of the current in one or more of the phase coils of the motor and to generate a polarity value that represents the detected current polarity. This circuit can include at least one comparator that has a first input coupled to a node between two of the plurality of switches, a second input coupled to receive a threshold value and an output at which the polarity value is provided. Also included is a controller that is configured to provide a plurality of pulse width modulated (PWM) output control signals that are coupled to the plurality of switches to control the switches to drive the current through the plurality of phase coils of the motor. In response to the polarity value, the controller can be configured to alter a duty cycle of the plurality of PWM output control signals to modify a voltage that is applied to the plurality of phase coils of the motor.

The system may include one or more of the following features alone or in combination. The controller can provide the plurality of PWM output control signals in a manner that results in pulse width modulation of the voltage applied to the plurality of phase coils of the motor. The plurality of phase coils of the motor can include three phase coils where each phase coil corresponds to a phase of the motor. The threshold value is equal to approximately one-half of a supply voltage. The circuit can include a plurality of comparators, where each comparator is associated with a respective phase of the motor, and where the controller samples the output of each of the plurality of comparators to generate the polarity value in the form of a multi-bit code. The controller can be configured to generate the code by sampling the output of each of the plurality of comparators on a falling edge of a PWM output control signal associated with the respective comparator. The controller can also be configured to alter the duty cycle of the voltage applied to at least one of the phase coils using the multi-bit code. The controller can be further configured to alter the duty cycle of the voltage applied to at least one of the phase coils during a consecutive PWM cycle using the multi-bit code, where a rising edge of a PWM clock signal begins a consecutive PWM cycle. In some instances, the controller can alter the duty cycle of the voltage applied to the plurality of phase coils of the motor using the code, and the controller can determine a new duty cycle using a look-up table containing a plurality of codes, each corresponding to a new duty cycle value.

Also described herein is a method for driving a motor that includes generating a plurality of pulse width modulated (PWM) switch control signals to selectively couple a plurality of switches to phase coils of the motor to drive current through the phase coils, and generating an output signal representative of a polarity of the current in one or more of the phase coils of the motor. The method further includes sampling the output signal to generate a polarity value and altering a duty cycle of a voltage applied to one or more of the phase coils of the motor in response to the generated polarity value.

The method may include one or more of the following features alone or in combination. Generating the output signal can include comparing, by one of more comparators, a voltage at a node between two of the plurality of switches to a threshold value to generate the output signal. Generating the output signal can include generating a plurality of output signals with a plurality of comparators and sampling the output signal can include sampling the plurality of output signals to generate the polarity value as a multi-bit code. Altering the duty cycle can include determining a new duty cycle using the multi-bit code. Sampling the plurality of output signals can include sampling the output signals of the plurality of comparators on a rising edge of a PWM output control signal associated with the respective comparator.

Still further described herein is a system for driving a motor that includes a motor driver that has a plurality of switches that are coupled to the motor to drive a current through each of a plurality of phase coils of the motor. Also included is a circuit that is configured to detect a polarity of the current in one or more of the phase coils of the motor and to generate a polarity value representative of the detected current polarity. A controller can be configured to provide a plurality of pulse width modulated (PWM) output control signals that are coupled to the plurality of switches to control the switches to drive the current through the plurality of phase coils of the motor. In response to the polarity value, the controller can alter a duty cycle of the plurality of PWM output control signals to modify a voltage applied to the plurality of phase coils of the motor.

BRIEF DESCRIPTION OF THE DRAWINGS

The foregoing and other objects, features and advantages will be apparent from the following more particular description of the embodiments and the appended claims, as illustrated in the accompanying drawings in which like reference characters refer to the same parts throughout the detailed description. Reference characters introduced in a figure may be repeated in one or more subsequent figures without additional description in the detailed description in order to provide context for other features of the described embodiments.

DETAILED DESCRIPTION

A system for driving a motor can include a motor driver that has a plurality of switches that are coupled to the motor to drive current through each phase coil of the motor. A polarity detection circuit can be used to detect the polarity of the current in the phase coils of the motor and generate a polarity value that represents the detected current polarity. The polarity detection circuit can include a comparator that has one input coupled to a node between two of the switches in the motor driver, another input that is coupled to receive a threshold value, and an output at which the polarity value is provided. The switches of the motor driver can be controlled by a controller that provides pulse width modulated output control signals to the switches to drive current through the phase coils of the motor. The controller can alter a duty cycle of the pulse width modulated output control signals to modify the voltage applied to the phase coils of the motor in response to the polarity value.

Figure 1:
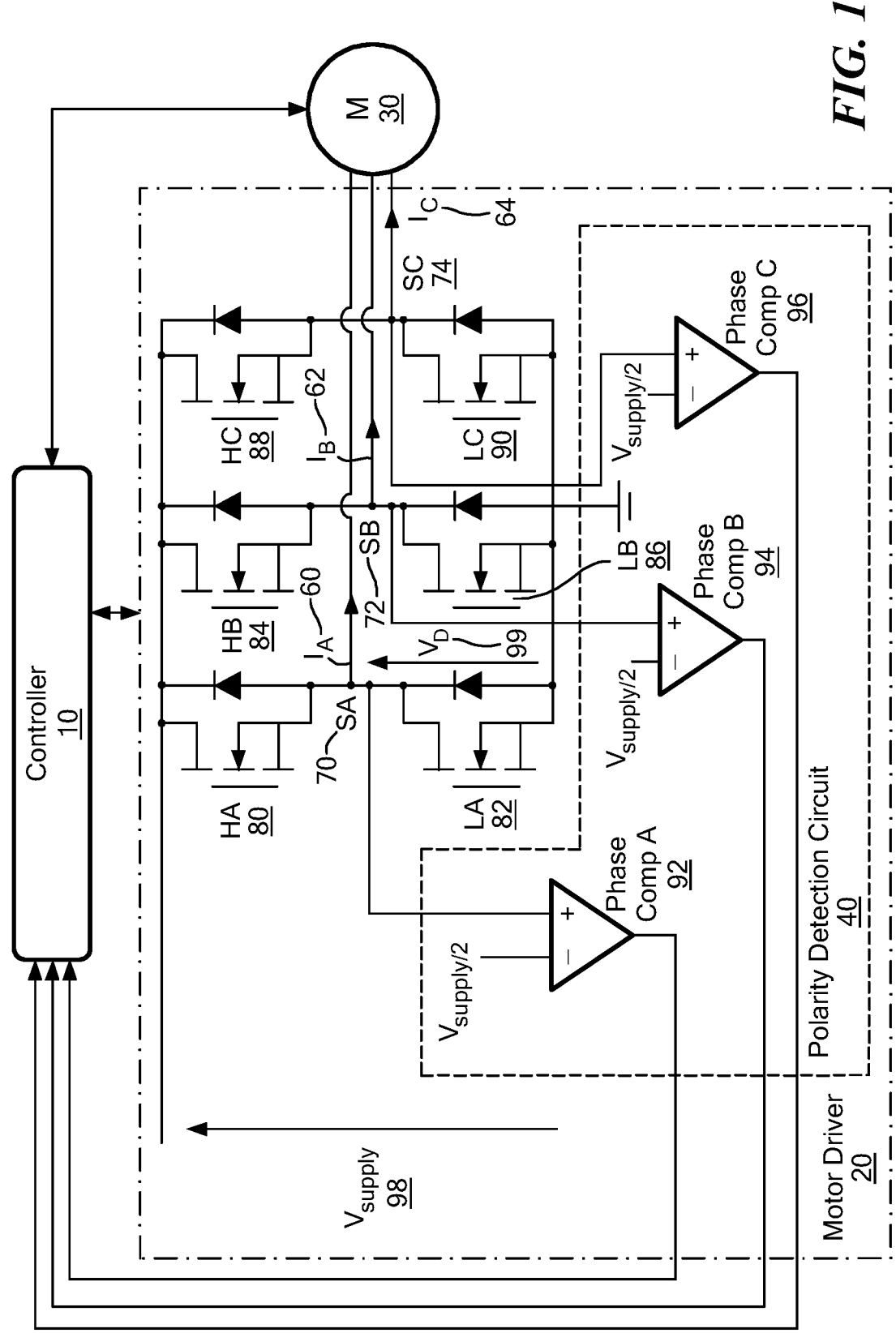
FIG. 1 is a circuit diagram depicting an embodiment of a motor driver circuit.

Illustrated in FIG. 1 is a motor driver circuit 20 that provides voltage and current to a load 30, which can be a motor 30. The motor driver circuit 20 can include a polarity detection circuit 40 that, together with the motor driver circuit 20, can be controlled by a controller 10.

Each phase of the motor 30 can be electrically connected to the motor driver 20 via one or more motor winding connection nodes "SA" 70, "SB" 72, "SC" 74, where each of these connection nodes can have an associated current, "$I_A$" 60, "$I_B$" 62, and "$I_C$" 64 that flows into and out of one or more phase coils of the motor 30. While FIG. 1 illustrates a motor 30 that has a first phase ("phase A"), second phase ("phase B") and third phase ("phase C"), it should be appreciated that the motor driver 20 can deliver voltage and current to a motor having any number of phases.

Switches within the motor driver circuit 20 can be associated with a phase of the motor 30. For example, the voltage provided to the motor 30 during phase A can be pulse width modulated by the switching of high side switch "HA" 80 and low side switch "LA" 82, and the modulated potential can be provided at motor winding connection node SA 70. The voltage provided to the motor 30 during phase B can be pulse width modulated by the switching of high side switch "HB" 84 and low side switch "LB" 86, and the modulated potential can be provided at motor winding connection node SB 72. The voltage provided to the motor 30 during phase C can be pulse width modulated by the switching of high side switch "HC" 88 and low side switch "LC" 90, and the modulated potential can be provided at motor winding connection node SC 74. Thus, switches HA 80 and LA 82 are associated with phase A of the motor 30, switches HB 84 and LB 86 are associated with the phase B of the motor 30, and switches HC 88 and LC 90 are associated with the phase C of the motor 30. The switches 80, 82, 84, 86, 88, 90 can be any switch including high-speed analog switches such as a Field Effect Transistor (FET). Each switch 80, 82, 84, 86, 88, 90 can have a body diode associated therewith. When a low-side switch (i.e. LA 82, LB 86, and LC 90) is closed, the body diodes can have a voltage drop equivalent to VD 99. While FIG. 1 only illustrates the voltage drop, VD 99, across the body diode of switch LA 82, it should be appreciated that, although not shown, the body diode of each of the switches 80, 82, 84, 86, 88, 90 can have a voltage drop of VD 99.

The controller 10 can be electrically and communicatively connected to the polarity detection circuit 40, the motor 30 and the motor driver 20. In some instances, the controller 10 can be electrically and communicatively connected to each switch 80, 82, 84, 86, 88, 90 such that the controller 10 can issue control signals to each switch to control its operation. The controller 10 can be a microcontroller, microprocessor, processor, a combination of logic gates or any other element capable of processing code or a set of instructions to carry out an algorithmic process. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital. A processor can contain internal processors or internal modules that perform portions of the function, operation, or sequence of operations of the processor. Similarly, a module can contain internal processors or internal modules that perform portions of the function, operation, or sequence of operations of the module.

A supply voltage or potential ("Vsupply") 98 can be provided to the motor driver circuit 20. Current $I_{A-C}$ 60-64 is delivered to the motor phases (i.e. phase A, phase B, and phase C), by pulse width modulation ("PWM") control of switches 80, 82, 84, 86, 88, 90. More particularly, output control signals generated by the controller 10 can be coupled to the control terminal (e.g., gate) of each of the switches 80, 82, 84, 86, 88, 90 to selectively turn on and off the switches with a predetermined sequence and duty cycle to actuate the motor 30.

Included within the polarity detection circuit 40 are comparators 92, 94, 96 that receive voltage representing the current provided to and from the motor 30 and compare the received voltage to a threshold. The comparators 92, 94, 96 can be any electrical component capable of comparing voltages and outputting a value representative of the comparison. In some embodiments, the comparators 92, 94, 96 are high speed comparators that can compare current or voltage to a threshold and output a value within hundreds of nanoseconds.

Each phase of the motor 30 can have an associated comparator. For example, phase comparator A 92 can be associated with the phase A of the motor 30, phase comparator B 94 can be associated with the phase B of the motor 30, and phase comparator C 96 can be associated with the phase C of the motor 30. While FIG. 1 illustrates a three-phase motor associated with three different comparators, it should be understood that the motor can have any number of phases, and each motor phase can have an associated phase comparator.

Comparators 92, 94, 96 can have two inputs, a first input coupled to receive a threshold value and a second input coupled to receive a voltage at a respective motor winding connection node (SA 70, SB 72 or SC 74). Using the threshold value and the motor winding connection node voltage, the comparators 92, 94, 96 can detect the polarity of the current in the respective phase of the motor 30 and output a value representative of this polarity. Current polarity refers to the direction of the flow of current with respect to the motor 30. For example, current polarity can be positive when current flows from Vsupply 98 into the motor 30, and current polarity can be negative when current flows out of the motor 30 and to a return potential of the Vsupply 98, e.g. ground.

Figure 2A:
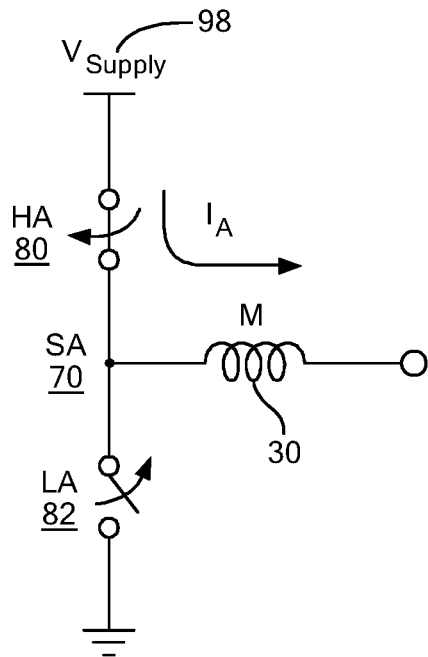
FIGS. 2A-2B are schematic diagrams showing embodiments of the operating conditions of the motor driver circuit of FIG. 1.
Figure 2B:
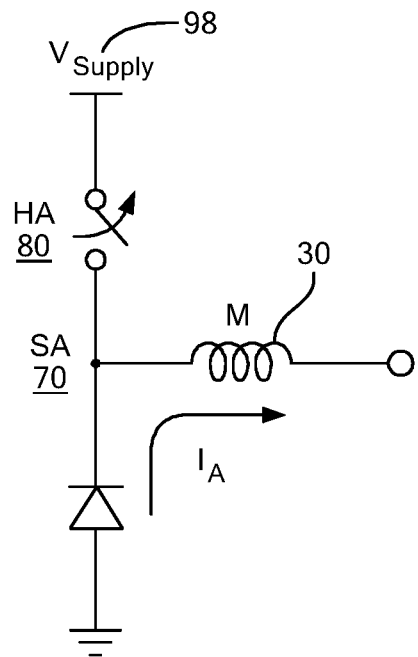
Figure 2C:
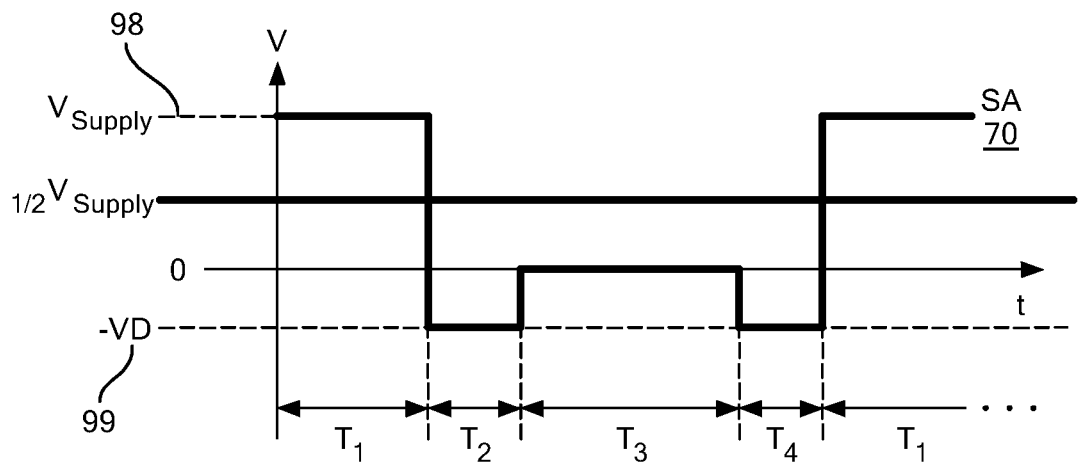
FIG. 2C is a timing diagram showing a voltage of a switching node of the motor driver circuit.
Figure 2D:
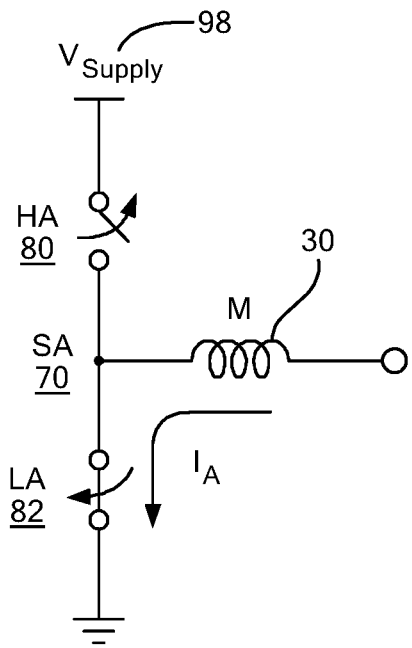
FIGS. 2D-2E are schematic diagrams showing embodiments of the operating conditions of the motor driver circuit of FIG. 1.
Figure 2E:
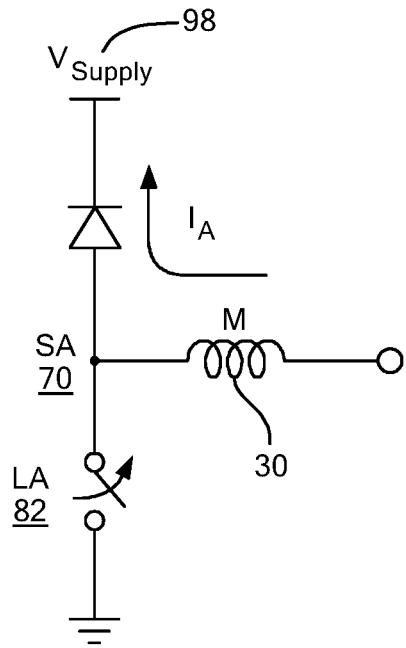
Figure 2F:
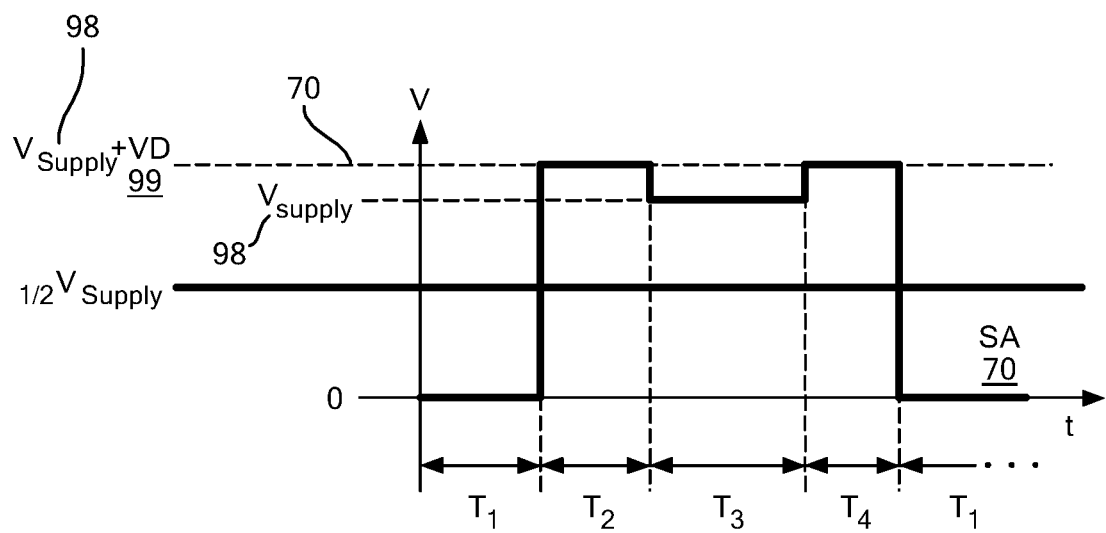
FIG. 2F is a timing diagram showing a voltage of a switching node of the motor driver circuit.

Illustrated in FIGS. 2A, 2B, 2D and 2E are operating conditions for the switches in the motor driver circuit 20. In some embodiments, each set of switches operates as a half-bridge circuit, such as the simplified circuits illustrated in FIGS. 2A, 2B, 2D and 2E. Shown in these figures is an equivalent circuit representation of switches HA 80 and LA 82, and their corresponding body diodes, and a winding or coil of a phase of the motor 30 (i.e. the winding of phase A of the motor 30). FIGS. 2A and 2B show current, $I_A$, flowing through the winding of the motor 30 (denoted by a winding "M") when current has a positive polarity and is being provided to the motor 30 from Vsupply 98. FIG. 2C illustrates a waveform of the voltage at motor winding connection node SA 70 over a time t when the current $I_A$ has a positive polarity. FIGS. 2D and 2E show current, $I_A$, flowing through the winding of the motor 30 (denoted by a winding "M") when current has a negative polarity and is flowing out of the motor 30. FIG. 2F illustrates a waveform of the voltage at motor winding connection node SA 70 over a time t when the current has a negative polarity.

Referring to FIGS. 2A and 2B, a winding of the motor 30 can be modelled as an inductor. When switch HA 80 is closed, switch LA 82 is open and current is sourced from Vsupply 98 to the motor 30. The current, $I_A$, in this configuration flows from Vsupply 98 to the motor 30 and therefore has a positive polarity. When switch HA 80 opens and switch LA 82 closes, current continues to flow in the same direction and have a positive polarity because the motor 30 is an inductive load and therefore the current cannot change instantaneously. Thus, during dead time when both HA 80 and LA 82 are open, current flows through the body diode of switch LA 82 and the voltage at motor winding connection node SA 70 reduces one diode voltage drop (VD) below ground ("GND"), or −VD.

FIG. 2C shows a timing diagram of the voltage at motor winding connection node SA 70 over time, t. As shown, a given cycle of operation can be divided into time segments $T_1, T_2, T_3$ and $T_4$ that repeat over the operation of motor driver 20. During time period T1, switch HA 80 is closed and switch LA 82 is open (e.g., as shown in FIG. 2A), and the voltage at motor winding connection node SA is substantially equal to the Vsupply 98. When switch HA 80 opens, switch LA 82 remains open for dead time, however the current through the motor 30 continues to flow through the body diode of LA 82 (e.g., as shown in FIG. 2B). Thus, during time period T2 when both switches 80, 82 are open (e.g., dead time), the voltage at motor winding connection node SA 70 is equal to GND minus the forward voltage of body diode of switch LA 82 (e.g. −VD). After dead time, during time period $T_3$, switch LA 82 might turn on, and the voltage of the motor drive signal at motor winding connection node SA 70 is substantially equal to GND. Switch LA 82 opens while switch HA 80 is still open, for dead time during time period T4, and the voltage at motor winding connection node SA 70 is equal to GND minus the forward voltage of the body diode of switch LA 82 (e.g. −VD).

Referring to FIGS. 2D and 2E, when switch HA 80 is open and switch LA 82 is closed, current is sunk from the motor 30 to GND such that current flows from the motor 30 toward ground and the current has a negative polarity. When switch LA 82 opens, the current continues to flow in the same direction because the motor 30 is an inductive load and the current in the motor 30 cannot change instantaneously. Thus, during dead time when both switch HA 80 and switch LA 82 are open, the current flows through the body diode of switch HA 80 and the voltage at motor winding connection node SA 70 rises one voltage drop (VD) above Vsupply 98, i.e. $V_{SA}$=Vsupply+VD.

FIG. 2F shows a timing diagram of the voltage at motor winding connection node SA 70 over time, t. As shown, a given cycle of operation can be divided into time segments $T_1, T_2, T_3$ and $T_4$ that repeat over the operation of motor driver 20. During time period T1, switch HA 80 is open and switch LA 82 is closed (e.g. as shown in FIG. 2D), and the voltage at node SA 70 is substantially equal to GND. When switch LA 82 opens, switch HA 80 remains open for dead time; however, the current through the motor 30 continues to flow through the body diode of switch HA 80 (e.g. as shown in FIG. 2E). Thus, during time period $T_2$ when both switches 80, 82 are open (e.g., dead time), the voltage at motor winding connection motor winding connection node SA is equal to Vsupply plus the forward voltage of the body diode of switch HA 80 (VD), i.e. $V_{SA}$=Vsupply+VD. After dead time, during time period $T_3$, switch HA 80 might close, and the voltage at motor winding connection node SA is substantially equal to Vsupply 98. Switch HA 80 opens and switch LA 82 is open for dead time during time period $T_4$, and the voltage at motor winding connection node SA 70 is equal to Vsupply plus the forward voltage of the body diode of switch HA 80, i.e. $V_{SA}$=Vsupply+VD.

It will be appreciated that the voltage at the motor winding connection nodes SA 70, SB 72, SC 74 depends on the polarity of the current associated with the respective phase of the motor 30. For example, during a dead time period associated with the switching of switch LA 82, the voltage at motor winding connection node SA 70 ($V_{SA}$) is equal to the negative of the voltage drop, VD 99, across the body diode of LA 82. The polarity of the current $I_A$ 60 into the motor 30 during phase A can be determined using the relationship between the potential at motor winding connection node SA 70 ($V_{SA}$) and the voltage drop VD 99, which in this instance is a positive polarity indicating that current is flowing from Vsupply 98 into the motor 30. Therefore, when the polarity of the current $I_A$ 60 is positive at the end of a dead time period, $V_{SA}$=–VD (e.g. as shown in time periods T2 and T4 of FIG. 2C). When the polarity of the current $I_A$ 60 is negative (i.e., flowing from the motor 30 back to Vsupply 98), the voltage at node SA 70 at the end of a dead time period is equal to Vsupply 98 plus VD 99, i.e. $V_{SA}$=Vsupply+VD (e.g. as shown in time periods T2 and T4 of FIG. 2F). It should be appreciated that this relationship is the same for each motor winding connection node (i.e. SA 70, SB 72, and SC 74) and the polarity of each associated current (i.e. $I_A$ 60, $I_B$, 62 and $I_C$ 64). Table 1 below illustrates this relationship for the additional nodes illustrated in FIG. 1.

TABLE 1

| Motor Phase | Node | Node Voltage for Negative Polarity | Node Voltage for Positive Polarity |
|---|---|---|---|
| Phase A | SA | $V_{SA}$ = Vsupply + VD | $V_{SA}$ = –VD |
| Phase B | SB | $V_{SB}$ = Vsupply + VD | $V_{SB}$ = –VD |
| Phase C | SC | $V_{SC}$ = Vsupply + VD | $V_{SC}$ = –VD |

A threshold value of one half of the supply voltage 98, or Vsupply/2 can be input into the comparators 92, 94, 96 as a reference voltage. The comparators 92, 94, 96 can compare the voltage at the motor winding connection nodes SA 70, SB 72, SC 74 to the threshold value (Vsupply/2) and output a value representative of the comparison. For example, when the current polarity is positive during dead time, the phase comparators 92, 94, 96 output a value of zero (0). When the current polarity is negative during dead time, the phase comparators 92, 94, 96 output a value of one (1). Sampling of the voltage at the nodes 70, 72, 74 can occur at the rising edge of the control signals for switches 80, 82, 84, 86, 88, 90, or the end of a dead time period.

Figure 3:
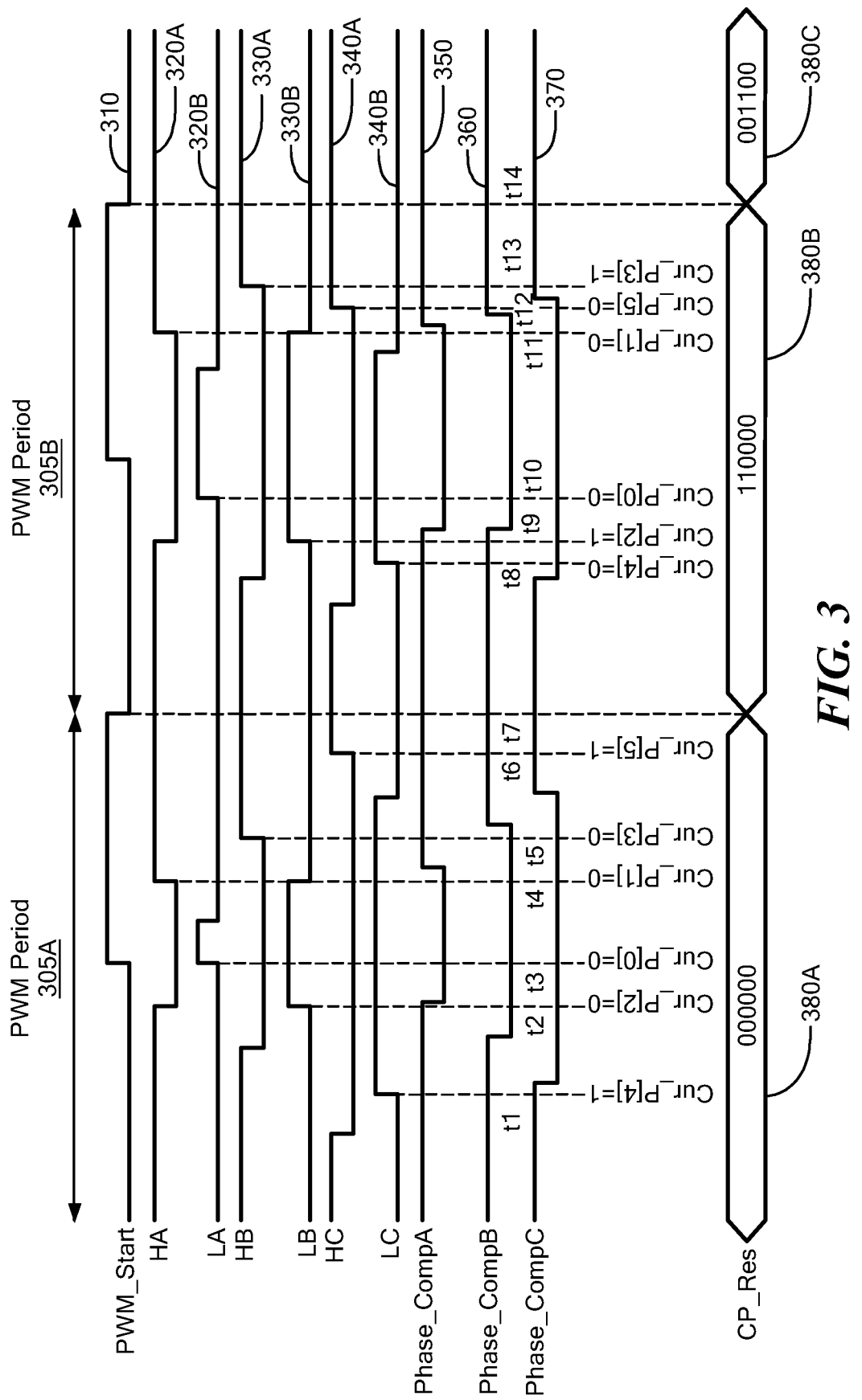
FIG. 3 illustrates example waveforms of the switching of the switches, the output of the comparators and a PWM control signal.

Referring now to FIG. 3, illustrated are waveforms demonstrating the switching of each switch 80, 82, 84, 86, 88, 90, the output of the comparators 92, 94, 96 and a PWM control signal 310 that has PWM periods or cycles 305A-305B. In some embodiments, the PWM control signal 310 can have a duty cycle of fifty percent (50%). Each rising edge of a switch control signal HA 320A, LA 320B, HB 330A, LB 330B, HC 340A, LC 340B (here labeled with times t1-t7) corresponds to an end of a dead time period. When a rising edge occurs, the controller 10 samples or otherwise obtains the output of the corresponding comparator.

The waveforms corresponding to the switching of switches HA 80 and LA 82 are labeled 320A and 320B respectively. The waveforms corresponding to the switching of switches HB 84 and LB 86 are labeled 330A and 330B respectively. The waveforms corresponding to the switching of switches HC 88 and LC 90 are labeled 340A and 340B respectively. Signals 320A, 320B, 330A, 330B, 340A, 340B may correspond to gate drive signals generated by controller 10 (FIG. 1) and coupled to the gate terminal of respective switches 80, 82, 84, 86, 88, 90. The waveform corresponding to the output of the comparator (e.g., comparator 92 of FIG. 1) associated with the phase A of the motor (Phase_CompA) is labeled 350. The waveform corresponding to the output of the comparator (e.g., comparator 94 of FIG. 1) associated with the phase B of the motor (Phase_CompB) is labeled 360. The waveform corresponding to the output of the comparator (e.g., comparator 96 of FIG. 1) associated with the phase C of the motor (Phase_CompC) is labeled 370.

Also demonstrated in FIG. 3 are one or more multi-bit codes 380A-380C that characterize the polarity of the current in each phase of the motor 30 during each PWM period 305A-305B. These six bit codes 380A-380C are generated during each PWM period 305A-305B. While FIG. 3 illustrates a six bit code, it should be appreciated that the code can have any number of bits. Furthermore, in some embodiments, the number of bits corresponds to (e.g. is equal to twice) the number of phases in the motor such that a four phase motor would require an eight bit code, while a five phase motor would require a ten bit code, and a single phase motor would require a two bit code.

The first PWM period 305A represents a ramp-up period for the circuitry, i.e. the motor driver 20 and/or the controller 10. Accordingly, the waveforms illustrated in FIG. 3 reflect switch and comparator output from startup onward. Similarly, the initial six bit code "000000" 380A issued during the first PWM period 305A is a default startup code that does not reflect the position or output of the switches or comparators during the first PWM period 305A. This six bit code is updated at each falling edge of the PWM signal 310.

During the first PWM period 305A, the controller samples the output signal 350, 360, 370 of each comparator 92, 94, 96, and at the falling edge of the PWM signal 310 (time t7) the controller 10 uses the samples to update the six bit code used to adjust the second PWM period 305B. For example, at the rising edge of switch control signal 320B for switch LA 82, the controller 10 samples the output of the corresponding comparator 92 which, at that time t3, has an output value of zero (0). Similarly, at the rising edge of switch control signal 320A for switch HA 80, the controller 10 samples the output of the corresponding comparator 92, which, at that time t4, has an output value of zero (0). At the rising edge of the switch control signal 330B for switch LB 86 (time t2) the output of the corresponding comparator 94 is zero (0), and at the rising edge of the switch control signal 330A for switch HB 84 (time t5) the output of the corresponding comparator 94 is zero (0). At the rising edge of the switch control signal 340B for switch LC 90 (time t1) the output of the corresponding comparator 96 is one (1), and at the rising edge of the switch control signal 330B for switch HC 88 (time t6) the output of the corresponding comparator 96 is one (1). Thus, at the end of the first PWM period 305A, which is marked by the falling edge of the PWM signal 310 at time t7, Phase_CompC 96 outputs a one (1) which indicates a negative current in phase C, Phase_CompB 94 outputs a zero (0) which indicates a positive current in phase B, and Phase_CompA 92 outputs a zero (0) which indicates a positive current in phase A. The six bit code 380B (i.e. "110000") is updated at time t7 and prior to the second PWM period 305B to reflect the determined current polarity for each phase during the first PWM period 305A. This six bit code 380B is illustrated below in Table 2. Once the multi bit code is determined, it can be used to control switching of the switches 80, 82, 84, 86, 88, 90 to compensate for the PWM signal 310.

TABLE 2

| Bit 5 | Bit 4 | Bit 3 | Bit 2 | Bit 1 | Bit 0 |
|---|---|---|---|---|---|
| 1 | 1 | 0 | 0 | 0 | 0 |
| Value at rising edge of HC | Value at rising edge of LC | Value at rising edge of HB | Value at rising edge of LB | Value at rising edge of HA | Value at rising edge of LA |
| Polarity during phase C is negative (i.e. "1") | | Polarity during phase B is positive (i.e. "0") | | Polarity during phase A is positive (i.e. "0") | |

During the second PWM period 305B, the controller samples the output signal 350, 360, 370 of each comparator 92, 94, 96, and at the falling edge of the PWM signal 310 (time t14) the controller 10 uses the samples to update the six bit code used to adjust the third PWM period 305C. For example, at the rising edge of switch control signal 320B for switch LA 82 (time t10) the output of the corresponding comparator 92 is zero (0), and at the rising edge of the switch control signal 320A for switch HA 80 (time t11) the output of the corresponding comparator 92 is zero (0). At the rising edge of the switch control signal 330B for switch LB 86 (time t9) the output of the corresponding comparator 94 is one (1), and at the rising edge of the switch control signal 330A for switch HB 84 (time t13) the output of the corresponding comparator 94 is one (1). At the rising edge of the switch control signal 340B for switch LC 90 (time t8) the output of the corresponding comparator 96 is zero (0), and at the rising edge of the switch control signal 330B for switch HC 88 (time t12) the output of the corresponding comparator 96 is zero (0). Thus, at the end of the second PWM period 305B, which is marked by the falling edge of the PWM signal 310 at time t14, Phase_CompC 96 outputs a zero (0) which indicates a positive current in phase C, Phase_CompB 94 outputs a one (1) which indicates a negative current in phase B, and Phase_CompA 92 outputs a zero (0) which indicates a positive current in phase A. The six bit code 380C (i.e. "001100") is updated at time t14 and prior to the third PWM period 305C to reflect the determined current polarity for each phase during the second PWM period 305B. This six bit code 380C is illustrated below in Table 3. Once the multi bit code is determined, it can be used to control switching of the switches 80, 82, 84, 86, 88, 90 to compensate for the PWM signal 310. The controller can continue determining the multi bit code 380A, 380B, 380C can continue until the circuitry, the motor driver 20 and/or the controller 10 power down.

a period of time and OFF for a period of time. The ratio of these periods of time to the overall period can be referred to as the duty cycle. These duty cycles can be adjusted using the multi bit code 380A, 380B, 380C generated by the controller 10 based on samples taken from each of the comparators 92, 94, 96. For example, as illustrated by the multi bit code 380B used to adjust switch operation during the second PWM period 305B, the current through phase C of the motor is negative and the current through phase B of the motor is positive. In response to determining the current polarity of phase C is negative, the controller reduces the amount of time HC 88 is switched ON by an amount of dead time (dead time duration) and increases the amount of time LC 90 is switched ON by the dead time duration. In response to determining the current polarity of phase B is positive, the controller increases the amount of time HB 84 is switched ON by the dead time duration and decreases the amount of time LB 86 is switched ON by the dead time duration.

Actuating a switch ON for a period of time can also be referred to as applying a signal via a switch for a period of time. Thus, when the current polarity is positive, the amount of time the high side switch (i.e. HA 80, HB 84, HC 88) applies a signal is increased and the amount of time the low side switch (i.e. LA 82, LB 86, LC 90) applies a signal is decreased to compensate for the reduced voltage applied to a motor phase as a result of the positive current polarity during the dead time. When the current polarity is negative, the amount of time the low side switch applies a signal is increased and the amount of time the high side switch applies a signal is decreased to compensate for the reduce amount of voltage applied to a motor phase as a result of the negative current polarity during the dead time.

Figure 4:
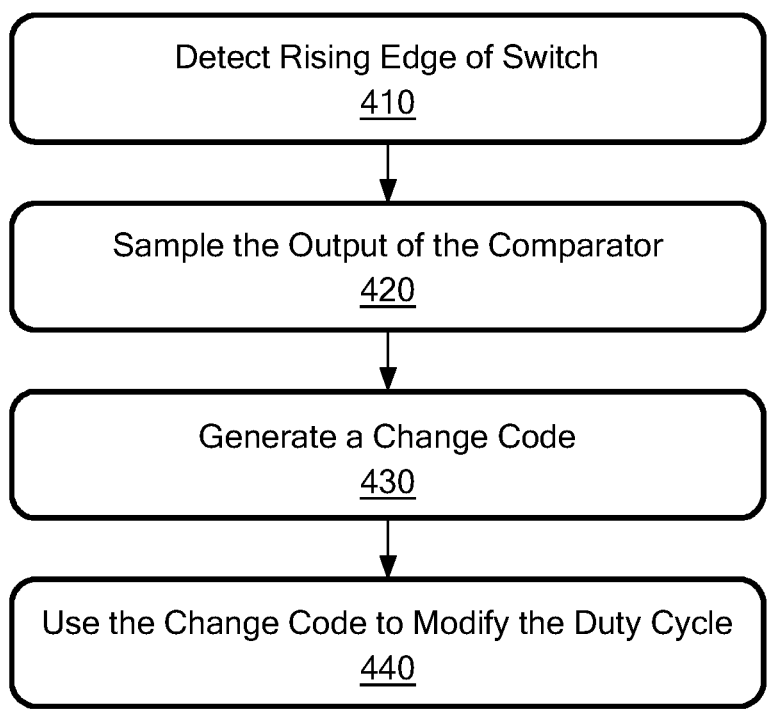
FIG. 4 is a block diagram illustrating an embodiment of the process of modifying the duty cycle of a voltage applied to a load.

Illustrated in FIG. 4 is a method of modifying the duty cycle of a PWM control signal. In some embodiments, the method can be carried out by the controller 10. The controller 10 can detect a rising edge of a switch control signal

TABLE 3

| Bit 5 | Bit 4 | Bit 3 | Bit 2 | Bit 1 | Bit 0 |
|---|---|---|---|---|---|
| 0 | 0 | 1 | 1 | 0 | 0 |
| Value at rising edge of HC | Value at rising edge of LC | Value at rising edge of HB | Value at rising edge of LB | Value at rising edge of HA | Value at rising edge of LA |
| Polarity during phase C is positive (i.e. "0") | | Polarity during phase B is negative (i.e. "1") | | Polarity during phase A is positive (i.e. "0") | |

It will be appreciated that while the example embodiment has the comparator outputs being sampled on the rising edge of the switch control signals (i.e., at the end of the dead time periods), sampling at other times is also possible. Sampling at the end of the dead time periods can be advantageous since the motor current generally has settled by that time.

The switches 80, 82, 84, 86, 88, 90 used to control operation of the motor can have an associated duty cycle in that each switch 80, 82, 84, 86, 88, 90 can be turned ON for (step 410) and upon detecting the rising edge (i.e. detecting an end point of a dead time), sample the output of the corresponding comparator (step 420). Based on the output of the comparator, the controller 10 can then generate a code (step 430) and use the code to modify the duty cycle of the of the PWM control signal (step 440) in order to thereby modify a duty cycle of a voltage applied to the load. While the process illustrated in FIG. 4 demonstrates sampling a single comparator, it should be appreciated that the steps of detecting the rising edge of a switch control signal (step 410) and sampling the output of the corresponding comparator (step 420) can be repeated until the end of a PWM period 305A-305B or until each switch has gone through at least one dead time period.

It should be appreciated that the circuit architectures and methods described herein are merely embodiments of the system for driving the motor, and that aspects of this system can be modified while maintaining the function of the system. All publications and references cited herein are expressly incorporated by reference in their entirety.

What is claimed is:

1. A system for driving a motor, comprising:
    a motor driver having a plurality of switches coupled to the motor to drive a current through each of a plurality of phase coils of the motor;
    a circuit configured to detect a polarity of the current in one or more of the phase coils of the motor and to generate a polarity value representative of the detected current polarity, wherein the circuit comprises at least one comparator having a first input coupled to a node between two of the plurality of switches, a second input coupled to receive a threshold value and an output at which the polarity value is provided; and
    a controller configured to provide a plurality of pulse width modulated (PWM) output control signals coupled to the plurality of switches to control the switches to drive the current through the plurality of phase coils of the motor, wherein the controller is configured to alter a duty cycle of the plurality of PWM output control signals to modify a voltage applied to the plurality of phase coils of the motor in response to the polarity value.

2. The system of claim 1, wherein the controller is configured to provide the plurality of PWM output control signals in a manner that results in pulse width modulation of the voltage applied to the plurality of phase coils of the motor.

3. The system of claim 1, wherein the threshold value is equal to approximately one-half of a supply voltage.

4. The system of claim 1, wherein the circuit comprises a plurality of comparators, each associated with a respective phase of the motor, and wherein the controller samples the output of each of the plurality of comparators to generate the polarity value in the form of a multi-bit code.

5. The system of claim 4, wherein the controller is configured to generate the code by sampling the output of each of the plurality of comparators on a rising edge of a PWM output control signal associated with the respective comparator.

6. The system of claim 4, wherein the controller is configured to alter the duty cycle of the voltage applied to at least one of the phase coils using the multi-bit code.

7. The system of claim 6, wherein a falling edge of a PWM clock signal begins a consecutive PWM cycle and wherein the controller is configured to alter the duty cycle of the voltage applied to at least one of the phase coils during the consecutive PWM cycle using the multi-bit code.

8. The system of claim 6, wherein the controller is configured to alter the duty cycle of the voltage applied to the plurality of phase coils of the motor using the multi-bit code.

9. The system of claim 8, wherein the controller is configured to determine a new duty cycle using a look-up table containing a plurality of codes.

10. The system of claim 1, wherein the plurality of phase coils of the motor comprises three phase coils, each phase coil corresponding to a phase of the motor.

11. A method for driving a motor comprising:
    generating a plurality of pulse width modulated (PWM) switch control signals to selectively couple a plurality of switches to phase coils of the motor to drive current through the phase coils;
    generating an output signal representative of a polarity of the current in one or more of the phase coils of the motor;
    sampling the output signal to generate a polarity value; and
    altering a duty cycle of a voltage applied to one or more of the phase coils of the motor in response to the generated polarity value.

12. The method of claim 11, wherein generating the output signal comprises comparing, by one of more comparators, a voltage at a node between two of the plurality of switches to a threshold value to generate the output signal.

13. The method of claim 12, wherein generating the output signal comprises generating a plurality of output signals with a plurality of comparators and wherein sampling the output signal comprises sampling the plurality of output signals to generate the polarity value as a multi-bit code.

14. The method of claim 13, wherein altering the duty cycle comprises determining a new duty cycle using the multi-bit code.

15. The method of claim 13, wherein sampling the plurality of output signals comprises sampling the output signals of the plurality of comparators on a falling edge of a PWM output control signal associated with the respective comparator.

16. A system for driving a motor, comprising:
    a motor driver having a plurality of switches coupled to the motor to drive a current through each of a plurality of phase coils of the motor;
    a circuit configured to detect a polarity of the current in one or more of the phase coils of the motor and to generate a polarity value representative of the detected current polarity; and
    a controller configured to provide a plurality of pulse width modulated (PWM) output control signals coupled to the plurality of switches to control the switches to drive the current through the plurality of phase coils of the motor, wherein the controller is configured to alter a duty cycle of the plurality of PWM output control signals to modify a voltage applied to the plurality of phase coils of the motor in response to the polarity value.

17. The system of claim 16, wherein the circuit comprises a plurality of comparators, each associated with a respective phase of the motor and having a first input coupled to a node between two of the plurality of switches, a second input coupled to receive a threshold value, and an output at which the polarity value is provided, wherein the controller is configured to sample the output of each of the plurality of comparators to generate the polarity value in the form of a multi-bit code.

18. The system of claim 17, wherein the controller is configured to sample the output of each of the plurality of comparators on a rising edge of a PWM output control signal associated with the respective comparator.

19. The system of claim 17, wherein the controller is configured to alter the duty cycle of the voltage applied to at least one of the phase coils using the multi-bit code.

20. The system of claim 17, wherein a falling edge of a PWM clock signal begins a consecutive PWM cycle and wherein the controller is configured to alter the duty cycle of the voltage applied to at least one of the phase coils during the consecutive PWM cycle using the multi-bit code.

\* \* \* \* \*

UNITED STATES PATENT AND TRADEMARK OFFICE
CERTIFICATE OF CORRECTION

PATENT NO.       : 10,924,052 B1
APPLICATION NO.  : 16/535271
DATED            : February 16, 2021
INVENTOR(S)      : Kamyar Khosravi et al.

It is certified that error appears in the above-identified patent and that said Letters Patent is hereby corrected as shown below:

In the Specification

Column 6, Line 14 delete "SA is" and replace with --SA 70 is--.

Column 6, Lines 19-20 delete "motor winding connection motor winding connection node" and replace with --motor winding connection node--.

Column 6, Lines 51-52 delete "motor winding connection motor winding connection node SA is" and replace with --motor winding connection node SA 70 is--.

Column 6, Line 53 delete "Vsupply plus" and replace with --Vsupply 98 plus--.

Column 6, Line 56 delete "SA is" and replace with --SA 70 is--.

Column 6, Line 59 delete "Vsupply plus" and replace with --Vsupply 98 plus--.

Column 8, Line 33 delete "signal" and replace with --signals--.

Column 9, Line 12 delete "signal" and replace with --signals--.

Column 9, Line 44 delete "code" and replace with --codes--.

Column 9, Line 45 delete "can continue until the" and replace with --until the--.

Column 10, Line 14 delete "code" and replace with --codes--.

Column 10, Line 40 delete "reduce" and replace with --reduced--.

Column 10, Lines 62-63 delete "of the of the PWM" and replace with --of the PWM--.

Signed and Sealed this
Third Day of May, 2022

Katherine Kelly Vidal
*Director of the United States Patent and Trademark Office*